O. F. PHILLIPS.
Shovel-Plow and Cultivator Points.
No. 152,510. Patented June 30, 1874.
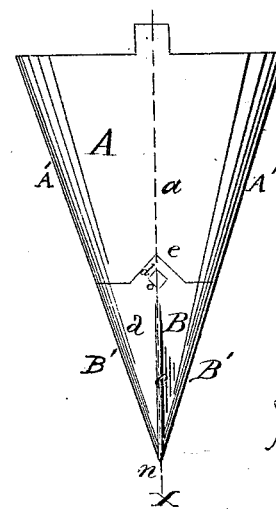
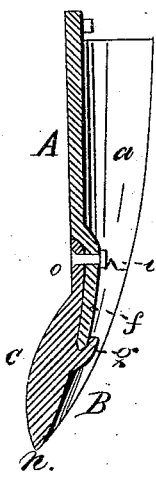
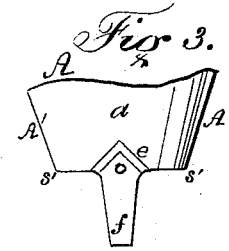
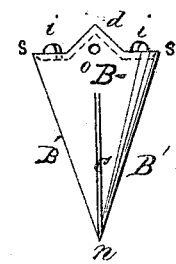
Witnesses.
Benjamin C. Pole
J. W. Cooper
Inventor.
Oscar F. Phillips
per R.S. & A.P. Lacey, attys.

UNITED STATES PATENT OFFICE.

OSCAR F. PHILLIPS, OF LYNCHBURG, VIRGINIA.

IMPROVEMENT IN SHOVEL-PLOW AND CULTIVATOR POINTS.

Specification forming part of Letters Patent No. 152,510, dated June 30, 1874; application filed April 9, 1873.

*To all whom it may concern:*

Be it known that I, OSCAR F. PHILLIPS, of the city of Lynchburg, in the county of Campbell and State of Virginia, have invented certain new and useful Improvements in Shovel-Plow and Cultivator Points; and I do hereby declare the following to be a full, clear, and exact description of the invention, such as will enable others skilled in the art to which it pertains to make and use it, reference being had to the accompanying drawings, which form part of this specification.

My invention relates to improvements in that class of shovel-plows in which cast-iron blades or shovels with removable points or shares are employed; and it consists in the mode of connecting such point to the main portion of the shovel, as hereinafter fully described.

In the accompanying drawings, which form part of this specification, Figure 1 represents a plan view of a blade or shovel with my improvements applied. Fig. 2 represents a section through the line $x\ x$, Fig. 1; and Figs. 3 and 4 are detail views of the lower end of the blade or shovel and share or point separately.

A represents a blade or shovel, which is formed with angular sides A', as shown in Fig. 1, and is constructed with a removable share or point, B, the sides B' of which, when the point is in position, as shown by Figs. 1 and 2, form continuations of the sides A'. The main part $a$ of the blade or shovel A, at $s'$, is formed at right angles to the center of the shovel, and is slightly beveled and provided with an angular and beveled recess, $e$, and a projecting portion, $f$, while the share or point B is provided with correspondingly-formed straight portions $s\ s$, and an angular beveled projecting portion, $d$, and a recessed bracket, $g$, which, when the parts are brought together in proper relation, interlock one within the other, as shown by Figs. 1 and 2. $i\ i$ are extensions on the under side of the share or point B, which are so arranged as to pass under the upper part $a$ and aid in holding the parts in correct relation. $o$ represents a screw-bolt, which, when the parts have been placed in position, as shown by Figs. 1 and 2, is passed through holes in the projections $d\ f$, and serves to lock the parts firmly in position. The share or point B, on its upper side, is constructed with a projecting pin, C, which extends from the extremity $n$ of the point B centrally along the point B very nearly to the hole for the reception of the bolt $o$. This projecting pin C is formed sharp on its upper edge, and in vertical section, as shown at Fig. 2, is semi-oval.

By constructing the shovels of plows with points or shares constructed and affixed in this manner it will be readily seen by persons acquainted with this class of plow that the point or share B is capable of being readily detached and replaced in the event of accident.

Having thus described my invention, I would have it understood that I do not claim, broadly, a blade or shovel provided with a removable point or share; but

What I do claim is—

In a shovel-plow, the detachable share B, having projection $d$, spurs $i\ i$, and bracket $g$, in combination with the blade A, having recess $e$, projection $f$, and bolt $o$, all constructed and operating substantially as described.

In testimony that I claim the foregoing I have hereunto set my hand this 14th day of March, 1873.

OSCAR F. PHILLIPS.

Witnesses:
   JNO. H. BAILEY,
   E. F. HOLT.